Dec. 9, 1930.  J. W. POSTEL  1,784,387
BRAKE MECHANISM FOR MOTOR VEHICLES
Filed Feb. 21, 1929
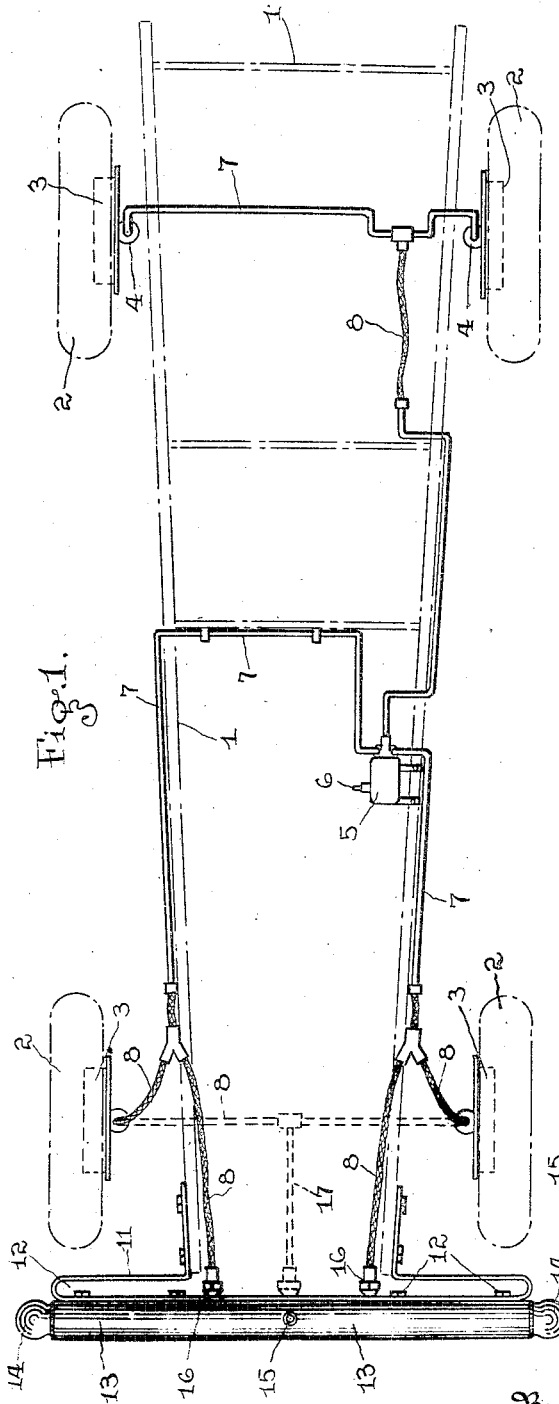
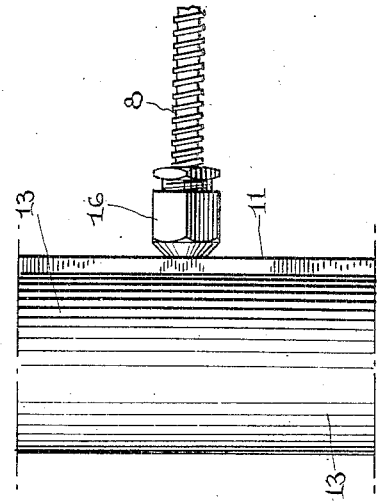
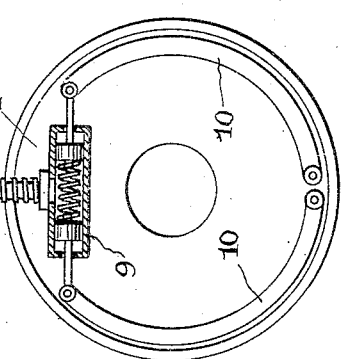
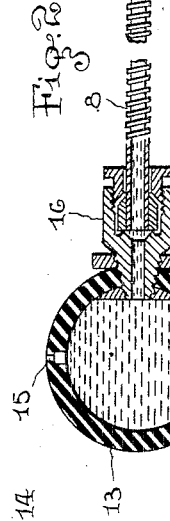
Inventor
John William Postel
By his Attorney
Clarence S. Ashley Patented Dec. 9, 1930

1,784,387

UNITED STATES PATENT OFFICE.

JOHN WILLIAM POSTEL, OF PALISADE, NEW JERSEY

BRAKE MECHANISM FOR MOTOR VEHICLES

Application filed February 21, 1929. Serial No. 341,617.

The invention relates to an improved brake mechanism for motor vehicles and has particular reference to a bumper member of a pneumatic type being connected through pipe connections with the two or four brake drums on the axle ends of such vehicle, said bumper, pipe connections, and a supply source therefore being filled with a fluid such as any of the viscous oils, to provide means for transmitting shock from such bumper means to said brakes to actuate either the unit or four-wheel brake forms of vehicle brake systems.

The object of the invention resides in the providing of a bumper means mounted on suitable supporting frames of vehicles (or suitable bumper means may also be on both front and rear assemblage of motor vehicles) said bumper being of the semi-resilient form of pneumatic tube provided with an air valve exhaust means, and suitable connection means to receive a pipe connection of metallic form, with flexible connection means, extending therefrom to the two or four-wheel brake drums of a motor car, and having interposed in line an oil or fluid supply source, the brake pedal and brake-shoe mechanisms having associated therewith means actuated from sudden contact shock with said bumper member and an adjacent obstacle, such contact on the distortion of said pneumatic tube, transmits by compression movement of said oil or fluid to effect the actuation of all of the brake-mechanism forming part of motor vehicular means.

In the following there is described the general and broad embodiment of the inventions the specific features thereof being pointed out hereinafter in the claims.

In the drawings Fig. 1 is a plan diagrammatic view of a motor vehicle chassis, illustrating the relative position thereon of the automatic bumper brake-actuating mechanism and of the pipe connective means to the four-wheel brakes of a vehicle and of the master hydraulic oil chamber and its relation with the brake-pedal of a vehicle; Fig. 2 is a cross section of the bumper and of one of the fluid pipe connector means, together with the brake shoe mechanism of a vehicle; Fig. 3 is a plan view in detail of the hydraulic bumper and of the pipe connector means therefor; and Fig. 4 is a detail cross sectional view of a modified form of bumper supporting frame.

Similar numerals of reference indicate similar parts throughout the several views of the drawings.

In the drawings 1 designates the chassis frame of a motor vehicle, provided with wheels 2, brake drums 3 and internal brakeshoe mechanism 4 either of the contracting or expanding form of braking means suitable for motor vehicle purposes.

Chassis 1 has disposed thereon preferably attached thereto by suitable supporting brackets a master oil or fluid supply chamber 5 provided with a feed valve 6 for tanking such fluid under required pressure, and radiating therefrom a series of copper tubes 7, extending from said chamber 5 to positions on said chassis 1 whereat suitable flexible pipe connections 8 are attached to project said fluids to actuating pistons 9 forming the means for expanding or contracting brake-shoes 10 whichever types of braking mechanism is to be employed.

Suitable valve actuating means is provided in connection with the brake-pedal of a motor vehicle's control system, to function in combination with the means forming the invention herein.

Said chassis 1 on the front end of the vehicle (and provision may be made for installation on the rear end of said vehicle of like means) is provided with a suitable bracket 11 to which there is attached by means of bolts 12 a semi or partly resilient rubber bumper tube or cylinder 13 having closed in ends 14 and having disposed therein an air vent valve 15 for permitting excess air to be forced therefrom when the hydraulic agent or viscous oil is forced therein from said master tank on chamber 5 through said series of pipe connections or tubes of forming the system of supplying such agent to the brake-valve mechanism 4. Bumper head or tube 13 may have mounted therein suitable nipples 16 to receive two connections 8 or it may have a single connective means 17 communicating with a single pipe supply duct to either the front or rear brake mechanism.

It being apparent that bumper supporting brackets 11 differ in many ways, some of which are single transverse bars, and others of double type form, the latter being the case, suits flexible connections and may be coiled beneath or around such bars to facilitate assemblage and to perfect said connecting means 7.

It is apparent that there are numerous oils and other fluids applicable for utility in connection with motor vehicle brake, actuating mechanism and reserve the right to employ a viscous body fluid that will function advantageously with the combination of structure as is herein shown, described and claimed.

It is obvious that the structure may be altered in many of its essential operative units without departing from the spirit of the invention and I therefore do not limit myself to the specific details as shown.

What I claim and desire to secure by Letters Patent of the United States is:—

1. A device of the character described comprising motor vehicular means, braking mechanism therefor, hydraulic pressure valves associated with said braking mechanism, a hydraulic fluid supply chamber, a pneumatic bumper mounted on said vehicular means arranged to receive fluid from said hydraulic supply chamber, fluid ducts connected up with said pressure valves said supply chamber and said bumper, and means whereby when pressure from contact distorts said bumper the fluid pressure therein affects said valves to actuate said braking mechanism of said vehicular means.

2. A device of the character described comprising a vehicular means for motor cars, braking mechanism associated therewith, fluid pressure valves connected with said braking mechanism, a fluid supply source, a manually controlled brake mechanism, a bumper support disposed on said motor car, a pneumatic rubber bumper, a series of pipe connections forming a fluid reception connective means with said pressure valves, said supply source, said manually controlled brake mechanism and said resilient bumper adapted to when compressed by the contact of said rubber bumper with an obstacle actuate said pressure valves to effect the braking of said braking mechanism upon the vehicular means of said motor car.

3. A device of the character described comprising a motor vehicle, a fluid brake accelerating mechanism therefor, a resilient bumper mechanism for said motor vehicle, a hydraulic fluid transmission means connecting up said brake and bumper mechanism, and means whereby when said resilient bumper mechanism is compressed by contact said fluid brake accelerating mechanism sets the brake mechanism of said motor vehicle.

4. A device of the character described comprising a motor vehicle, fluid actuated brake means therefor, a pneumatic bumper mechanism therefor, a fluid supply means, a series of tubes forming connective means between said brake mechanism bumper mechanism and said fluid supply means, fluid pressure valves associated with said braking mechanism, and means whereby when said bumper is under compression said fluid actuates said valves to effect the operation of said braking mechanism for said motor vehicle.

5. A device of the character described comprising a motor vehicular means, brake mechanism therefor, fluid pressure valves associated with said brake mechanism, a fluid actuated brake accelerating system for said brake mechanism, and a pneumatic bumper mechanism connected in line with said pneumatic fluid actuated brake mechanism arranged to actuate said pressure valves to set the brake mechanism for said motor vehicle.

6. A device of the character described comprising a motor vehicle, vehicular means therefor, brakes forming part of said vehicular means, fluid actuated pressure valves associated with said brakes, a fluid supply chamber, a brake pedal mechanism, a series of connective pipes connecting said valves with said fluid supply chamber, a semipneumatic bumper tube mounted on said motor vehicle connected in line in said connective pipes and arranged to receive its hydraulic moment from said fluid supply chamber, an air release valve in said pneumatic bumper, and means whereby when said semipneumatic bumper is brought in contact with an obstacle said fluid actuates said valves to effect the operation of said brakes on said vehicular means.

In testimony whereof, I have signed my name to this specification this 15th day of February, 1929.

JOHN WILLIAM POSTEL.